United States Patent [19]
Hoffman et al.

[11] Patent Number: 5,917,719
[45] Date of Patent: Jun. 29, 1999

[54] INTERNALLY PROGRAMMABLE MODULAR POWER SUPPLY AND METHOD

[75] Inventors: David C. Hoffman, Santa Cruz; Karl S. Johnson, Palo Alto, both of Calif.

[73] Assignee: Power Ten, Inc., Los Gatos, Calif.

[21] Appl. No.: 08/909,161

[22] Filed: Aug. 11, 1997

[51] Int. Cl.⁶ .................................................. H02M 7/155
[52] U.S. Cl. ............................................. 363/84; 363/124
[58] Field of Search .................................. 363/16, 50, 65, 363/71, 81, 84, 125

[56] References Cited

U.S. PATENT DOCUMENTS

| | | | |
|---|---|---|---|
| 4,633,241 | 12/1986 | Casteel et al. | 340/645 |
| 4,797,833 | 1/1989 | El-Amawy et al. | 364/483 |
| 4,933,825 | 6/1990 | Allington et al. | 363/16 |
| 5,311,419 | 5/1994 | Shires | 363/65 |
| 5,690,849 | 11/1997 | DeVilbiss et al. | 219/497 |
| 5,737,197 | 4/1998 | Krichtafovitch et al. | 363/17 |

*Primary Examiner*—Adolf Deneke Berhane
*Attorney, Agent, or Firm*—Flehr Hohbach Test Albritton & Herbert LLP

[57] ABSTRACT

An internally programmable power supply for use with an AC input voltage supplied to an input terminal for producing a DC output voltage. At least one power conversion module is providing having an input and an output. The input of the at least one power conversion module is adapted to be connected to the AC input. The at least one power conversion module includes rectifier means for converting the AC voltage to a DC voltage and a filter to provide the DC output voltage. A digital controller is connected to at least one power conversion module and includes a feedback network having a plurality of feedback components for forming a feedback loop. A microprocessor is provided and a keyboard accessible to the user is coupled to the microprocessor. A logic device is coupled to the microprocessor and is provided with a logic programming interface. Switches couple the logic device to the plurality of feedback components and are used for selecting feedback loops components at the request of the user to permit tailoring of the power supply phase and frequency response to a wide variety of user loads on the DC output.

9 Claims, 3 Drawing Sheets

INTERNALLY PROGRAMMABLE MODULAR POWER SUPPLY AND METHOD

This invention relates to an internally programmable modular power supply and more particularly to such a power supply for use in burn-in systems.

Power supplies for burn-in have heretofore been provided. Typically four primary technologies have been used in the past which included series regulated, wide-range switch-mode, SCR phase-controlled, and hybrid SCR/series pass. All are capable of providing power at varying voltages and high current. Such power supplies have also been supplied in modular form for example each module for any 3.3 KW capability so that three of such modules provided a 10 KW power supply. Such a power supply has been externally programmable through a connector provided in the rear of the power supply module or modules. This external programming is used to control the voltage and current rise or decrease. Such power supplies have often included feedback circuitry which compares voltage or current to a reference voltage to control the output so that it remains constant. However, such feedback circuitry often performs badly when highly inductive or capacitive loads are placed on the power supply which shift the phase of the feedback signal. Such power supplies, in addition to only being programmable externally, have limited feedback capabilities and have lacked many features which would increase their capabilities and make them more user friendly. There is therefore a need for a new and improved power supply.

In general, it is an object of the present invention to provide an internally programmable modular power supply which is internally programmable.

Another object of the invention is to provide a power supply and method which can be internally programmed for multiple steps to provide a sequence which if desired can be repeated.

Another object of the invention is to provide a power supply and method of the above character permitting the user to select from a plurality of feedback components to provide a feedback loop which optimizes the performance of the power supply.

Another object of the invention is to provide a power supply and method of the above character in which a programmable logic device is utilized to provide a frequency synthesizer for creating user selectable variable frequency synchronization pulses for determining the conversion frequency of the power supply.

Another object of the invention is to provide a power supply and method of the above character in which programmed logic is utilized to provide flexibility to be capable of responding to user needs.

Another object of the invention is to provide a power supply and method of the above character which includes an expansion bus so that features can be readily added as required by the user.

Another object of the invention is to provide a power supply and method of the above character in which the power supply phase and frequency response can be tailored to meet a wide variety of load and user requirements.

Another object of the invention is to provide a power supply and method of the above character to provide redundant overvoltage protection.

Another object of the invention is to provide a power supply and method of the above character in which a non-volatile memory is utilized to collect and store operating parameters for information and failure analysis.

Additional objects and features of the invention will appear from the following description in which the preferred embodiments are set forth in detail in conjunction with the accompanying drawings.

In general, the internally programmable power supply is for use with an AC input voltage supplied to an input terminal and is used for producing a DC output voltage comprised of at least one power conversion module having an input and an output with the input being adapted to be connected to the AC input. Each power conversion module includes means for a full wave rectifier converting the AC voltage to a DC voltage, a filter which includes bulk DC capacitors and a DC-to-DC converter to provide an adjustable DC output voltage. A digital controller is connected to the at least one power conversion module. The digital controller includes a feedback network having a plurality of feedback components for forming a plurality of different control loops. The digital controller includes a microprocessor and a programmable logic device coupled to the microprocessor and a keyboard accessible by a user. Means is coupled to the logic device and to the plurality of feedback components including switch means for selecting one or more of the feedback components at the selection of the user through the keyboard to permit tailoring of the power supply phase and frequency response to a wide variety of loads of the user and other user requirements.

Figure 1:
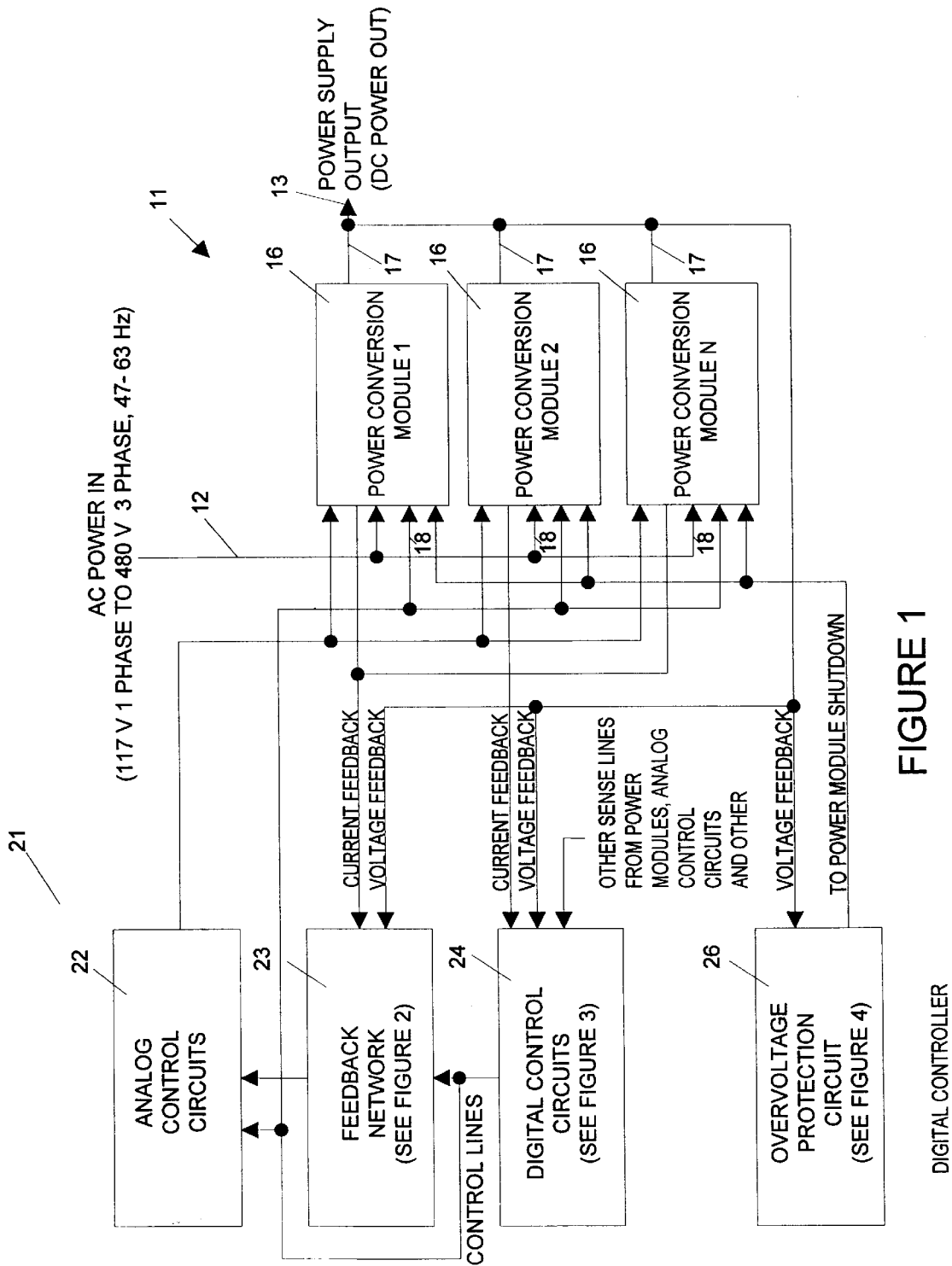
FIG. 1 is a block diagram of an internally programmable modular power supply incorporating the present invention.

More in particular, the internally programmable module or power supply 11 as shown in FIG. 1 consists of an AC power input 12 which is adapted to be connected to a source of AC power of a conventional type ranging from 117 volts single-phase to 480 volt 3-phase 47–63 Hz. The power supply also includes a DC power output 13. The power supply 11 also includes at least one power conversion module 16 and typically includes a plurality of power conversion modules 16 identified as Power Module 1, Power Module 2 and Power Module N, each of which has an output 17 connected in parallel to the DC output 13. The power conversion modules 16 are provided with inputs 18 which are connected in parallel to the AC power input 12.

The power conversion modules 16 are substantially conventional. Each consists of a full wave full bridge rectifier, a filter which includes bulk DC capacitors and a DC-to-DC converter for providing an adjustable DC output. The DC output can range from a maximum rating as low as 5 volts to 600 volts. The output of each power supply can be adjusted from 0 volts to the maximum rating.

Figure 2:
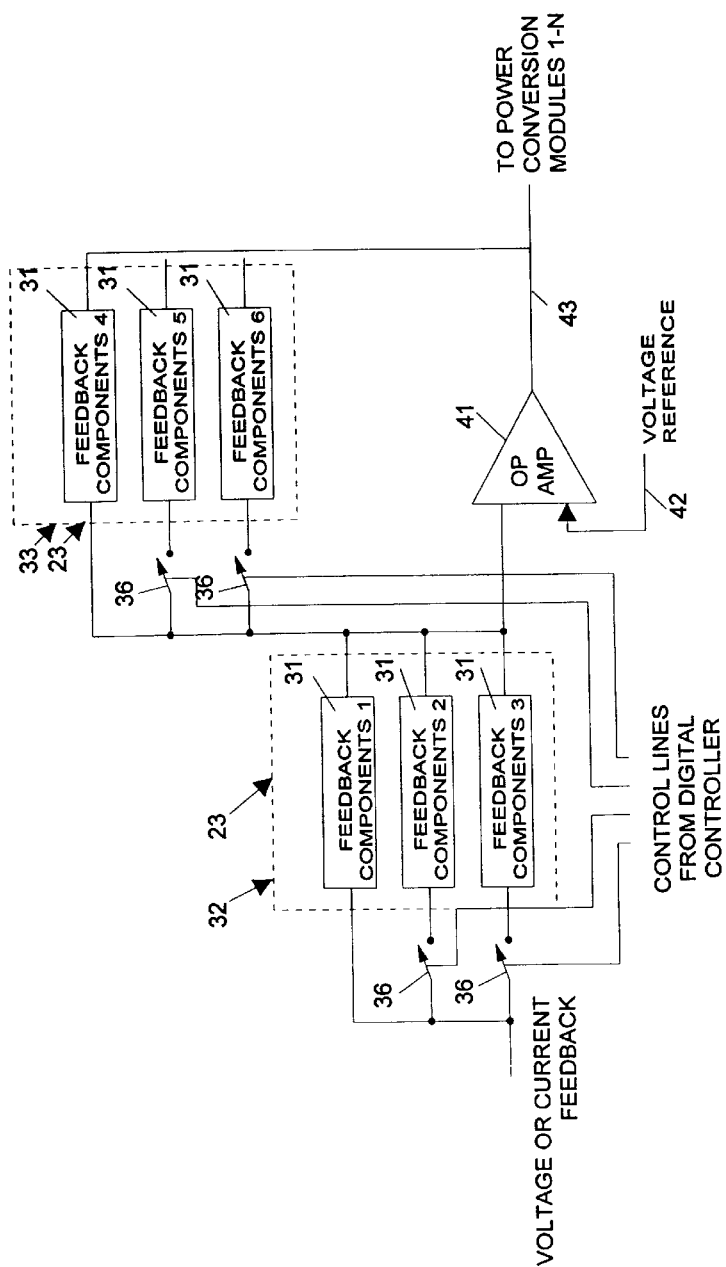
FIG. 2 is a block diagram of the feedback network shown in block form in FIG. 1.
Figure 4:
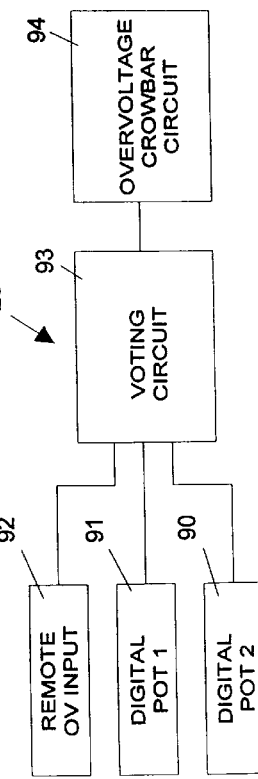
FIG. 4 is a detailed block diagram of the overvoltage block circuitry utilized in the power supply shown in FIG. 1.
Figure 3:
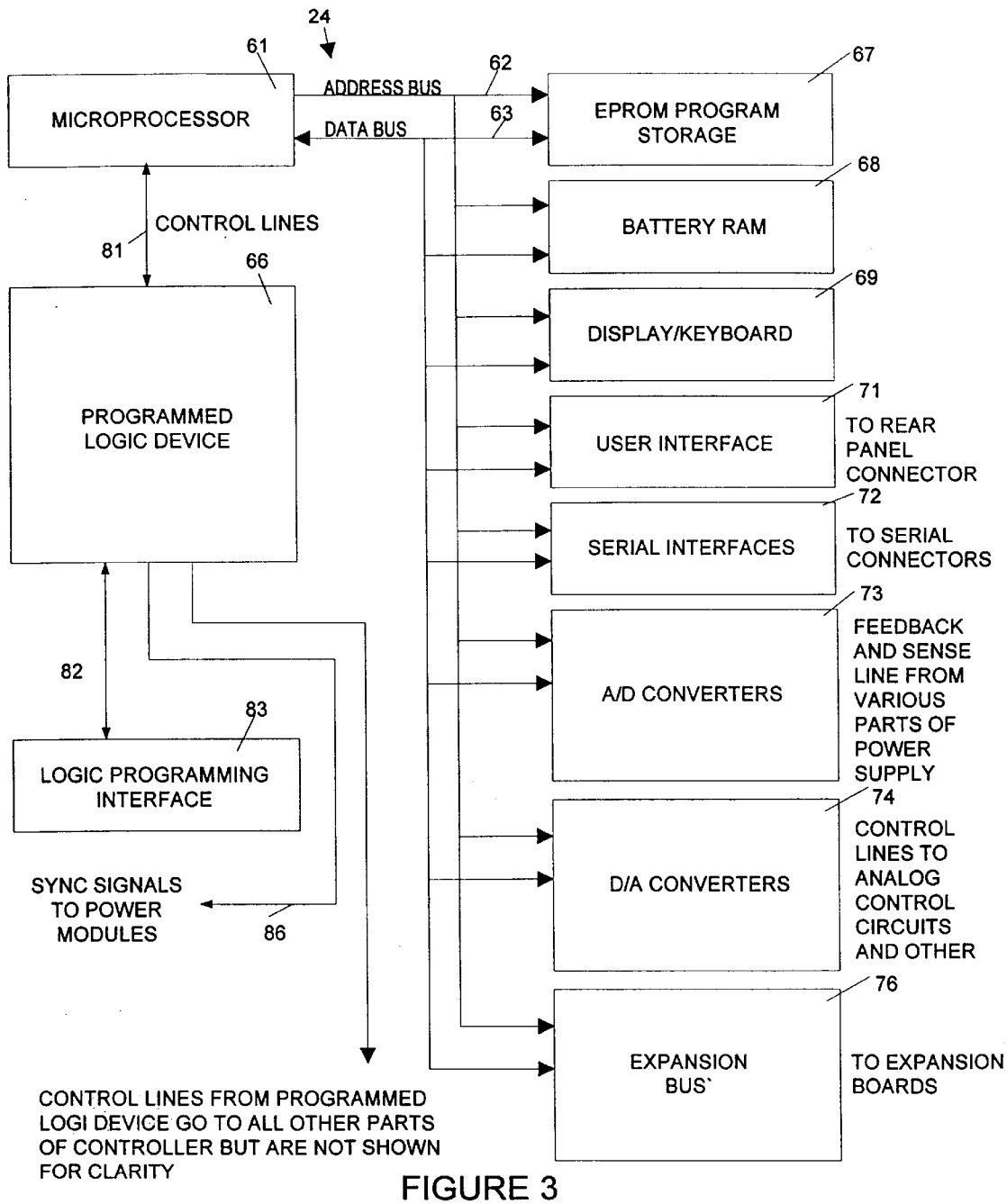
FIG. 3 is a block diagram of the digital controller utilized in the power supply shown in FIG. 1.

The power supply 11 includes a digital controller 21 which is interconnected with the power conversion modules 16 with the circuitry as shown. The digital controller 21 typically can be on a single printed circuit board and carries circuitry of the type shown in FIG. 1 and as shown therein consists of analog control circuits 22, a feedback network 23 of which a more detailed block diagram is shown in FIG. 2, digital control circuits 24 of which a more detailed block diagram is shown in FIG. 3, and an overvoltage protection circuit 26 of which a more detailed block diagram is shown in FIG. 4. The analog control circuits 22 are conventional and typically include error amplifiers which operate in conjunction with the feedback control network 23. From each power conversion module 16 the feedback network 23 receives a plurality of feedback signals including current feedback and voltage feedback signals from the power conversion modules which are operated on as hereinafter described in conjunction with the feedback network 23 and the digital control circuits 24 to change the phase and gain of the feedback signal as selected by the user from the front panel (not shown) of the power supply. These feedback signals are supplied to the analog control circuits 22 and to the error amplifiers therein which compare the feedback signal to a reference voltage and provide a difference voltage which is supplied to the power conversion modules. By way of example, if a user desires to have a five-volt output from the power supply 11, the user from the front panel would set the reference voltage at five volts. The feedback from the power conversion module is compared with the five-volt reference and the error amplifier creates an error voltage which drives the output of the power conversion module 16 to reach the five-volt requirement. At that point in time, the feedback signal from the power module will match the reference voltage and the error amplifier will have a constant output.

As shown in FIG. 2, the feedback network 23 consists of a wide variety of feedback components which can be used for making feedback loops having various characteristics permitting the user to use different loads on the output of the power supply module. The feedback components are in the form of a number of resistors and capacitors which are formed into a plurality of groups 31 which are identified in FIG. 2 as Feedback Component 1, Feedback Component 2 and so on through Feedback Component 6. It should be appreciated that in accordance with the present invention, fewer or greater number of groups of components can be provided if desired. The groups 31 of feedback components are formed into two sets 32 and 33 in which one group of components is a permanent part of the set and the other two groups can be switched into and out of the sets by switches 36. Thus, as shown, Feedback Components 1–3 are included in set 32, typically to provide lag, and have outputs connected in parallel to the input of an operational amplifier 41 which is supplied with a reference voltage 42 selected by the user as hereinbefore described. The other set 33 of Feedback Components 4–6, typically to provide lead, has one group of feedback components permanently connected whereas Feedback Components 5–6 which are switchable in parallel with the Feedback Components 4 by additional switches 36 with their outputs being connected in parallel and supplied to the output 43 of the operational amplifier 41 and thence to the power circuits for the power modules 16 as shown in FIG. 1. A more detailed description of the operation of the feedback network is hereinafter described.

The digital control circuits 24 as depicted in FIG. 3 in a more detailed block diagram consists of a microprocessor 61 which can be of a suitable type such as an Intel Pentium. The microprocessor 61 is connected to an address bus 62 and a data bus 63 as shown in FIG. 2. As also shown, the address bus 62 and the data bus 63 are connected to a programmed logic device 66, to an EPROM program storage 67, a battery RAM 68, a display/keyboard 69, a user interface 71, serial interfaces 72, A/D converters 73, D/A converters 74 and an expansion bus 76.

The micro processor 61 is also connected by control lines 81 to the programmed logic device 66 and similarly, the programmed logic device 66 is connected by control lines 82 to a logic programming interface 83. Additional control lines 86 are provided for connecting the programmed logic device 66 to the power conversion modules 16 for supplying synchronization signals to the power modules.

The internally programmable power supply 11 is user programmable. This permits the microprocessor 66 to receive user information from the keyboard 69 permitting the user to define a set of steps that the power supply is to execute. For example such step can consist of a set of operating parameters such as voltage, operating current, overvoltage level, voltage and the time duration. Multiple steps may be programmed and at the end of the steps the sequence selected by the user can be repeated or the power supply 11 can be programmed to set the output to zero after the completion of the program. All of these features can be internally programmed without the need for external components or devices.

The user-generated program is stored in the battery RAM 68 which is a battery backup RAM. The user generated program in the battery RAM is executed by the microprocessor 61. A typical example of a user-generated program can cause the following steps to be executed. Turn on, go to 7.0 volts DC, limit the current to 500 amperes and maintain that condition and voltage for 3 hours. At the end of 3 hours reduce the voltage to 5 volts and reduce the current limit to 350 amperes and maintain that condition for 16 additional hours. At the end of the 16 hours turn off. Such a program could be utilized for burn-in applications, plating applications and other applications. By way of example up to 10 consecutive steps may be programmed by the user without the use of external devices or components.

The power supply 11 can also be customized for a particular user to provide additional features through the use of the programmed logic device 66 which typically is programmed by the manufacturer. For example, if a user of the power supply 11 desires an extra control line from that typically supplied with the power supply 11, this can be obtained by programming the programmed logic device 66. Typically a desired feature can be defined by a series of equations generated by the manufacturer's computer and then fed into the programmed logic device 66 through the logic programming interface 83. through the logic programming interface 83 to become a permanent part of the logic in the programmable logic device 66. In effect, the hardware within the power supply is changed without physically changing any hardware. Thus it can be seen that the programmed logic device 66 allows reconfiguration of the hardware in response to user needs by programming the control logic of the power supply. Also, the manufacturer can, if desired, override the original program placed in the logic device 66 by the manufacturer by introducing desired changes through the logic programming interface 83.

By use of the programmed logic device it is possible to provide a frequency synthesizer permitting the creation of variable frequency synchronization pulses which can be utilized in conjunction with a wide variety of power supply configurations. With the power supply 11 of the present invention, it is possible to create a wide range of operating frequencies for a wide range of power supply configurations without the need of changing any components within the power supply. This frequency, as for example 80 KHz, can be programmed into the programmable logic device 66 by the manufacturer by use of the logic programming interface 83 during initial power-up of the power supply. The setup menu includes a menu item that permits the user to choose the operating frequency of the power supply. The frequency synthesizer can consist of a presettable down counter that acts as an "n" divider where "n" can be any number permitting a high frequency to be divided down to the desired frequency by changing the divide ratio of the counter.

The programmed logic device 66 can be of a suitable type such as one supplied by Cypress Semiconductor under Cypress No. CY7C373 which has 64 macrocells and 64 pins to provide great versatility. Such a device is provided with a large number of gates which are initially unconnected. A compiler at the manufacturer is utilized in conjunction with equations supplied to it to compile the equations into a fuse map that controls the manner in which the gates are interconnected to transform the basically random logic of the Cypress Semiconductor device into the desired logic by programming of the chip.

As hereinbefore pointed out, the programmable logic device permits customization of the power supply for the user by adding or modifying circuits.

Additional capabilities have also been provided in the digital controller 16 by providing the expansion bus 76. This feature can be utilized to provide the user with abilities that are beyond the programming capabilities of the programmable logic device 66. Thus a custom card can be made which can be plugged into the primary controller to add the desired features. Thus features can be added in the field or at the factory of the manufacturer simply by plugging in a small daughterboard (not shown) to the main or mother printed circuit board carrying the digital controller 21. Such a small daughterboard can include an IEEE-488 controller, a controller for a second slave power supply, as well as other user-requested options.

As hereinbefore explained, in the power supply 11 of the present invention it is possible to utilize feedback control loops, the parameters of which are selectable by the user through the front panel forming a part of the interface 83 to permit tailoring of the power supply phase and frequency response to a wide variety of loads to meet user requirements. The performance of the feedback loop will change in accordance with any number of parameters. For example, a change in the input voltage will change the performance of the feedback loop. Similarly, changes in the load will also affect the performance of the feedback loop as for example where the load is capacitive, inductive or resistive. The feedback loop should be as versatile as possible so that a wide variety of loads can be accommodated. Typically, they are fixed at the time of manufacture of the power supply. With the present invention it is possible to provide a large variety of user selectable feedback parameters to permit working over a very broad range of loads and under different operating conditions. Typically a much broader range is made possible than would be possible with a single set of feedback elements. The feedback elements can be chosen by the user by use of the front panel and/or the keyboard 69.

As can be seen from FIG. 2, the feedback components 1 and 4 are always in the circuit because they have no switch 36 in series with them. However, feedback components 2 and 3 and feedback components 5 and 6 can be switched in and out by the user to accommodate different loads placed on the power supply 11 by the user. This can be accomplished by permitting the user through the front control panel (not shown) of the power supply 11 to override the manufacturer's programmed setup. By selecting the appropriate menu, the user can make a compensation adjustment by placing into the computer a binary code which advises the computer which of the switches 36 are to be closed or remain open. This selection of the feedback components 2 and 3 and 5 and 6 is stored in the battery backup RAM 68 and remains therein so that each time the power supply is turned on it will cause the switches 36 to assume the same selected positions. The power supply will thus remain with the selected feedback components until the selection is changed by the user by appropriate input to the front panel. Thus it can be seen that the feedback network 23 makes it possible to utilize the digital control circuitry to permit the user to choose from many feedback circuit options to better optimize the performance of the power supply for the user application in which the feedback components can be switched in or out through the use of electronic switches controlled by the digital control circuitry from the front panel as selected by the user. In this manner it is possible to substantially improve the frequency response, transient response and phase margin of the power supply 11.

The overvoltage protection circuit 26 as shown in more detail in FIG. 4 protects the load placed on the DC output of the power supply 13 from overvoltages. This overvoltage protection circuit has been implemented by utilizing dual digital potentiometers 90 and 91 identified as digital pot 1 and digital pot 2 in conjunction with a remote overvoltage input 92. The outputs from the digital potentiometers 90 and 91 and a remote overvoltage input 92 are supplied to a voting 93 circuit which selects the lowest voltage of the multiple voltages supplied to it. The user, through the remote input 92, is able to select the overvoltage setting for the power supply 11 which typically may be 1.1 times the output rating selected for the power supply 11. Thus, the overvoltage value is set slightly above or over the full voltage rating selected for the power supply. If one overvoltage circuit fails, the voting circuit 93 chooses the one which requests the lowest voltage to assure an overvoltage set point will never be exceeded. This provides a higher degree of protection than a single set point circuit. In addition if any one circuit fails, the other circuit will take over and protect the user's devices on the DC output 13 from overvoltages. After the voting circuit 26 has made its selection, this information is supplied to a conventional overvoltage crowbar circuit 94 which performs a conventional function of protecting the power supply load from excessive voltage.

In summary, the circuitry in FIG. 4 provides overvoltage shutdown by monitoring the output of a power supply and shutting it off should the output go beyond the overvoltage set point. Improved overvoltage protection is provided by the present invention by utilizing the voting circuit that monitors three overvoltage set points. The lowest set point of the three will always be dominant. If one of the set point circuits fails, the overvoltage circuit will still protect the load. Thus, there is provided redundancy of the overvoltage reference for decreased probability of error.

In the power supply of the present invention, a non-volatile memory in the battery RAM 68 is utilized to collect and store operating parameters for information and failure analysis. These parameters include, but are not limited to air temperature, AC input voltage, total operating time and power conversion module status. This recordation of these parameters is important to the manufacturer as well as to the user. Thus in the present invention it is possible to record the peak air temperature the power supply 11 has been exposed to over its entire life. This makes it possible for the manufacturer to check the power supply if the user has returned the power supply to ascertain why the power supply failed and to ascertain for what reason the power supply was damaged while being used by the user. The same is true with respect to input voltage which helps the manufacturer to ascertain for what reason failure has occurred. This information is supplied from the power modules to the A/D converters through the microprocessor 61 and then into the battery RAM 68. Typically each of these pieces of data is reviewed several times a second and this data is compared with the data which is already present in the memory. If any parameter as for example temperature or voltage is higher than the data previously stored in the memory, the current data will replace the older data in the memory. If not, the previous information on the data will remain in the memory. Thus it is only necessary for the battery RAM to remember one number for each parameter over the life of the power supply. And at the same time, the battery RAM will also record the time (date, hour and minute) at which the data was recorded. Such information is particularly helpful to the manufacturer in connection with warranty problems which may arise with respect to the power supply. In addition, the power supply has the capability of ascertaining the time at which a module has failed or if the module intermittently has problems. Such information is also recorded in the battery RAM 68.

In view of the foregoing, it can be seen that there has been provided an internally programmable modular power supply and a method of operation which has many desirable features. The power supply is internally programmable without the need for external components or devices which can be programmed to provide single and multiple steps of programmed sequences and in which steps can be asked to be repeated. The power supply and method have the capability of creating variable frequency synthesization and makes it possible for the user to accommodate a wide variety of loads. The programmed logic device forming a part of the power supply makes it possible for the manufacturer to customize a power supply to meet specific user demands. An expansion bus permits additional features to be added to the power supply in the field. A redundant overvoltage protection has been provided to reduce the probability of error. A non-volatile memory is utilized to correct and store operating parameters to aid in failure analysis and to provide warranty information.

What is claimed is:

1. An internally programmable power supply for use with an AC input voltage supplied to an input terminal for producing a DC output voltage comprising at least one power conversion module having an input and an output, the input of at least one power conversion module being adapted to be connected to the AC input, said at least one power conversion module including rectifier means for converting the AC voltage to DC voltage and a filter to provide the DC output voltage, a digital controller connected to said at least one power conversion module, said digital controller including a feedback network having a plurality of feedback components for forming a feedback loop having selected feedback components from said plurality of feedback components, a microprocessor, a logic device coupled to the microprocessor, a keyboard accessible to a user coupled to the logic device and to the plurality of feedback components and including means for selecting feedback components with the microprocessor at the request of the user through the keyboard to permit tailoring of the power supply phase and frequency response to a wide variety of user capacitive, inductive or resistive loads on the DC output.

2. A power supply as in claim 1 wherein three power conversion modules are provided.

3. A power supply as in claim 1 further comprising overvoltage protection circuitry connected to the said at least one power conversion module, said overvoltage protection circuitry including means providing a plurality of overvoltage set points and voting circuit means connected to said means providing a plurality of overvoltage set points for monitoring the plurality of overvoltage set points for selecting the lowest voltage of the plurality of overvoltage set points to be dominant to protect the load of the user and to thereby provide a redundancy of overvoltage references for decreased probability of error.

4. A power supply as in claim 1 wherein said digital controller includes means internal of the power supply for defining at least one set of steps to be executed by the power supply with said at least one set of steps including the steps of setting the values for the parameters of operating voltage, operating current and overvoltage protection and setting time duration, all of said at least one set of steps being programmed internally through the keyboard in the digital controller with the program being stored in the non-volatile memory.

5. A power supply as in claim 1 wherein said microprocessor in conjunction with said keyboard includes means for forming a frequency synthesizer to create a variable frequency synchronization pulse.

6. A power supply as in claim 1 further including a non-volatile memory coupled to said microprocessor, said non-volatile memory and said microprocessor including means for collecting and storing operating parameters for information and failure analysis, including at least one of the following, air temperature, AC input voltage, total operating time and power conversion module status and date and time.

7. A method for use by a user for providing a DC output voltage from an AC input voltage by the use of at least one power conversion module which rectifies the AC voltage to a DC voltage, filters the DC voltage and converts the DC voltage to a desired voltage for the DC output and provides current and voltage feedback information for a feedback loop, the method comprising providing a feedback network having a plurality of feedback components, providing a microprocessor, providing a logic device coupled to the microprocessor, providing a keyboard accessible to the user and coupled to the logic device, selecting by use of the keyboard by the user feedback components from the feedback network and switching them electronically into the feedback loop to provide a feedback signal with respect to a voltage reference selected by the user to control the DC output from the at least one power conversion module so that the DC output corresponds to the selected reference voltage.

8. A method as in claim 7 further comprising the steps of providing a plurality of overvoltage set points and repeatedly checking overvoltage set points and voting to ascertain which of the overvoltage set points has the lowest voltage set point to control the output of the DC power output to thereby provide a redundancy of overvoltage reference set points for decreased probability of error.

9. A method for use by a user for providing adjustable overvoltage protection for an internally programmable power supply for producing a DC power output voltage from an AC input for use with a load to protect the load from overvoltage comprising the steps of providing a microprocessor, providing a logic device coupled to the microprocessor, providing a keyboard accessible to the user and coupled to the logic device, providing a plurality of overvoltage protection circuits, selecting by the use of the keyboard by the user a plurality of overvoltage set points for use by the overvoltage protection circuits for controlling the DC power input causing the overvoltage protection circuits to continuously check for overvoltage on the DC output and voting to ascertain which set point is to be utilized to control the DC power output to select the lowest voltage set point to control the DC power output to thereby provide redundant overvoltage protection.

* * * * *